United States Patent Office 3,524,633
Patented Aug. 18, 1970

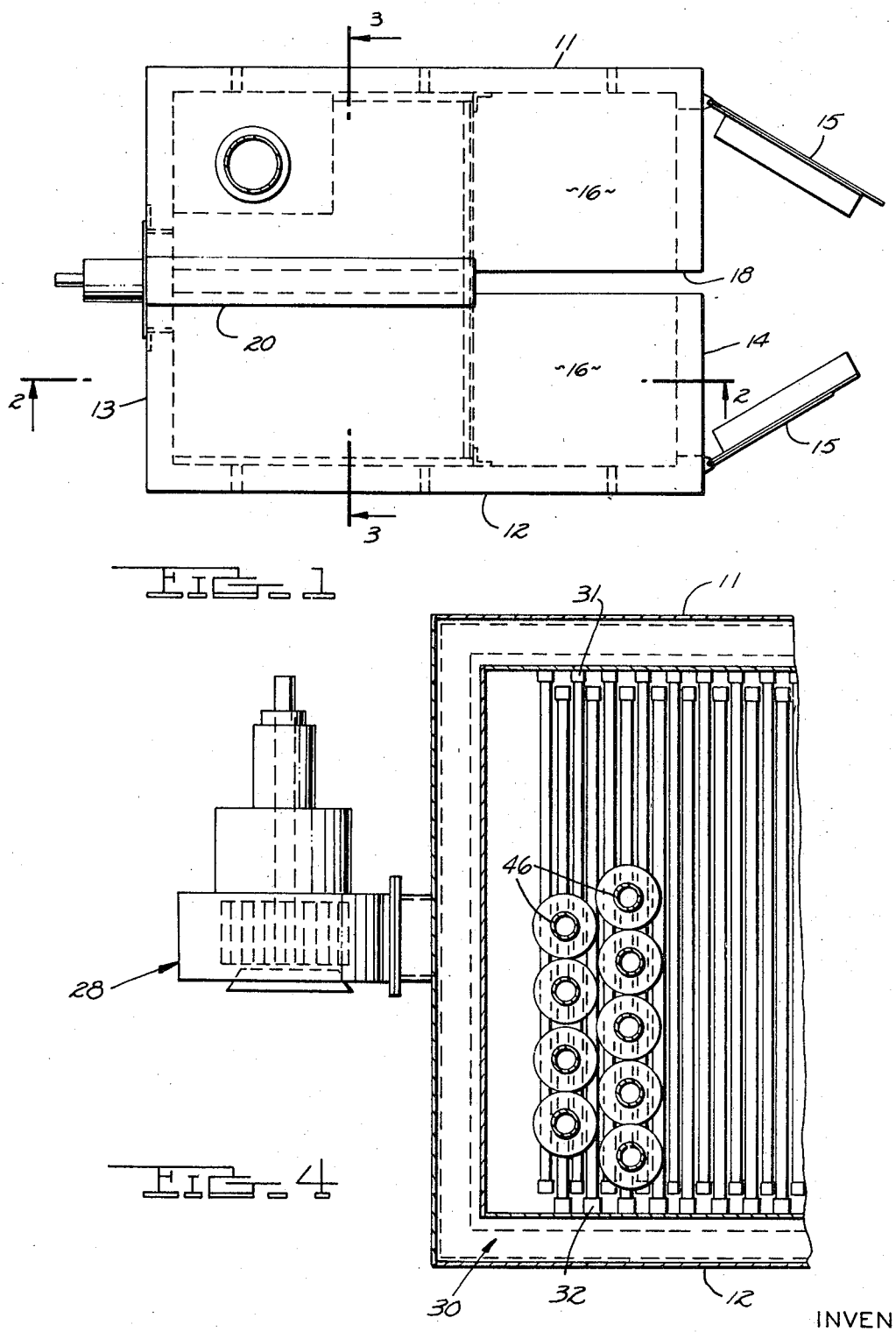

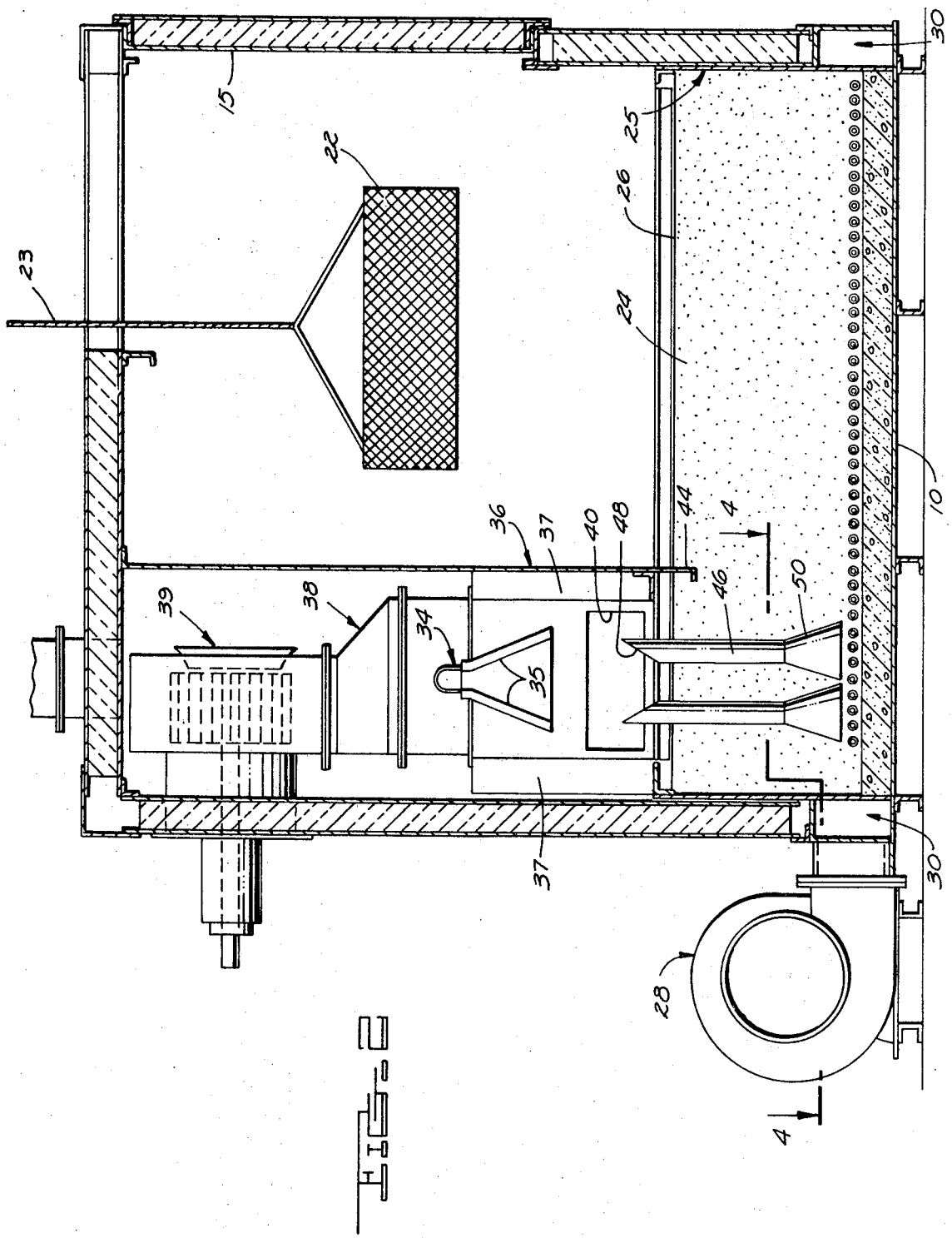

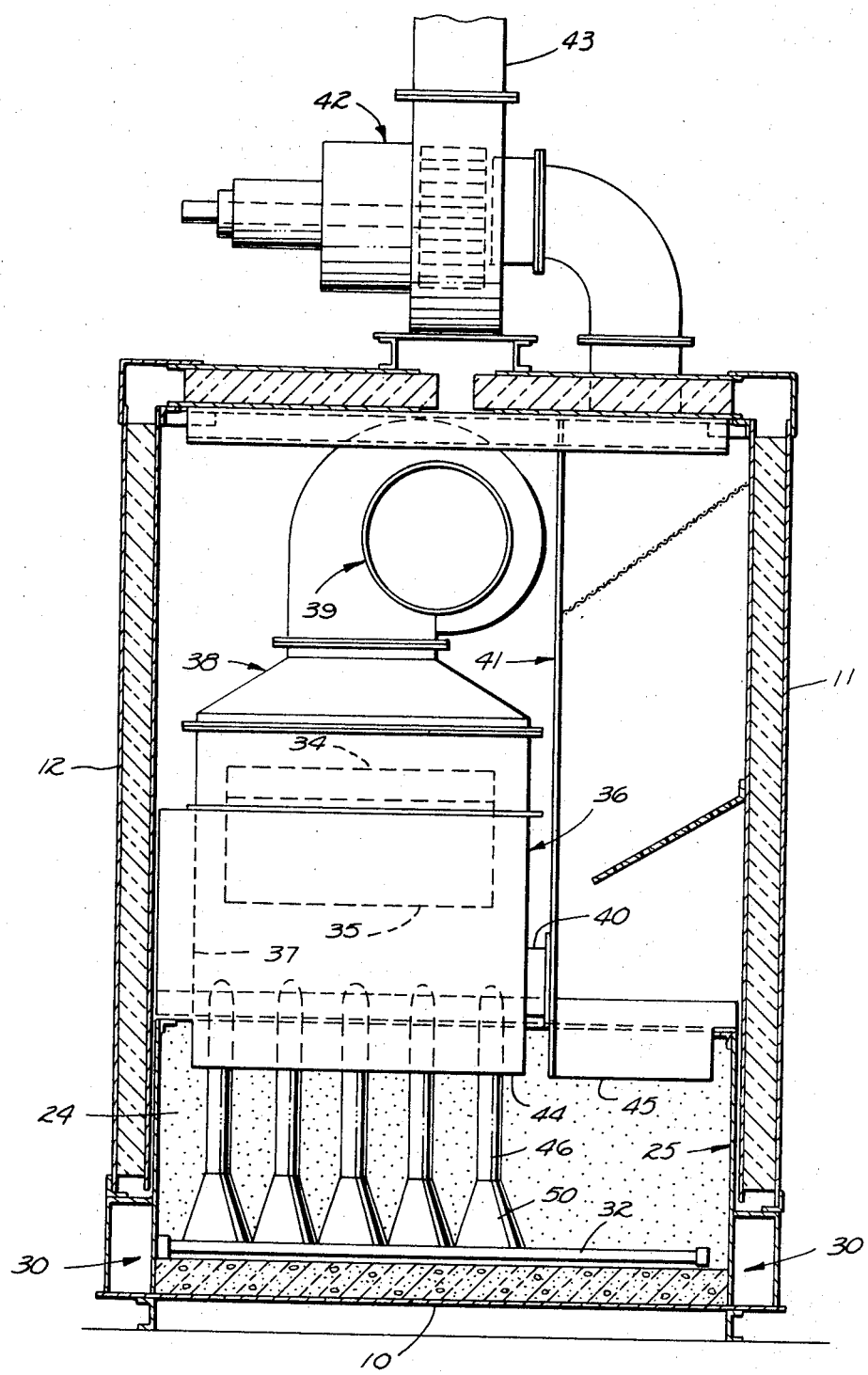

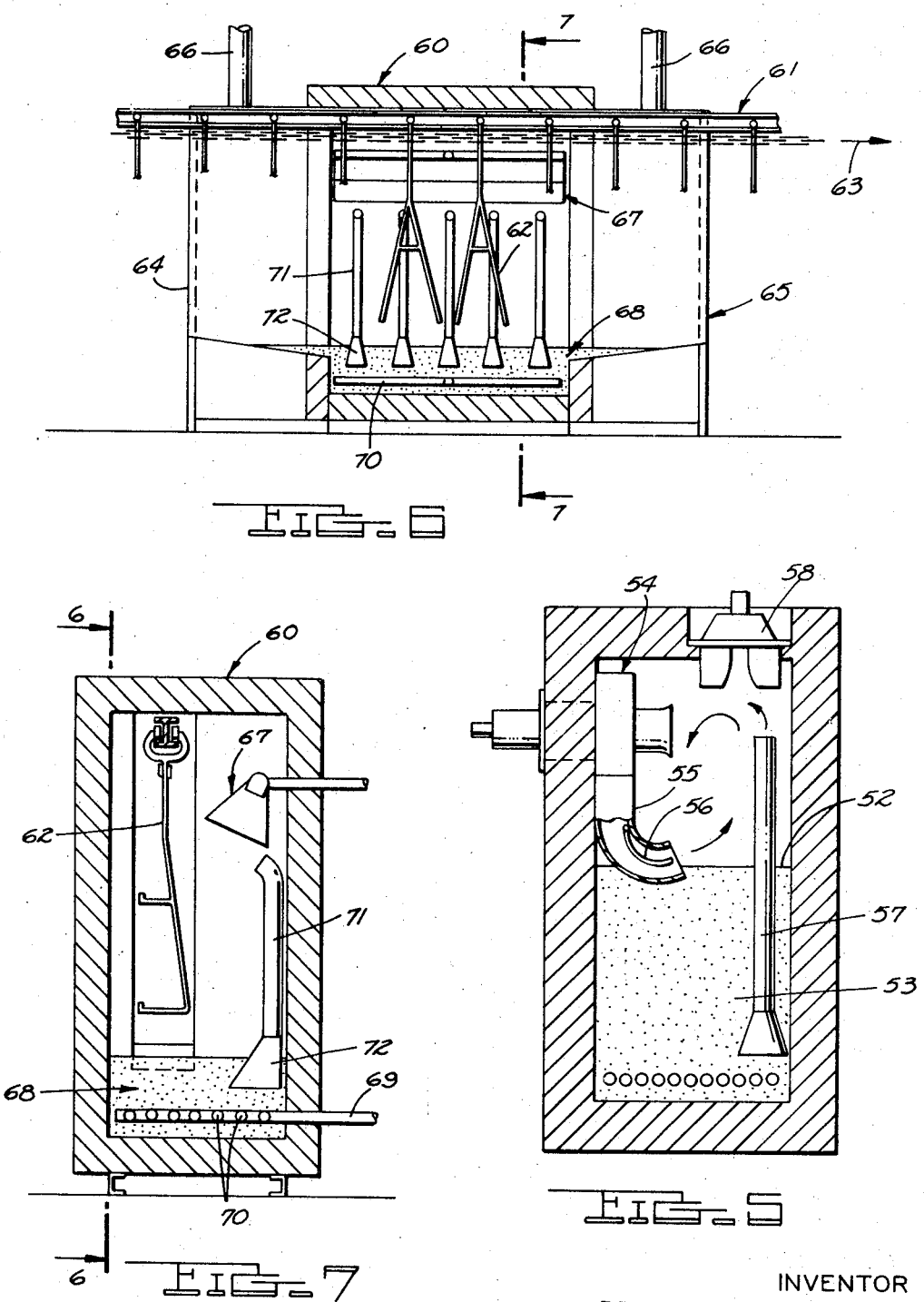

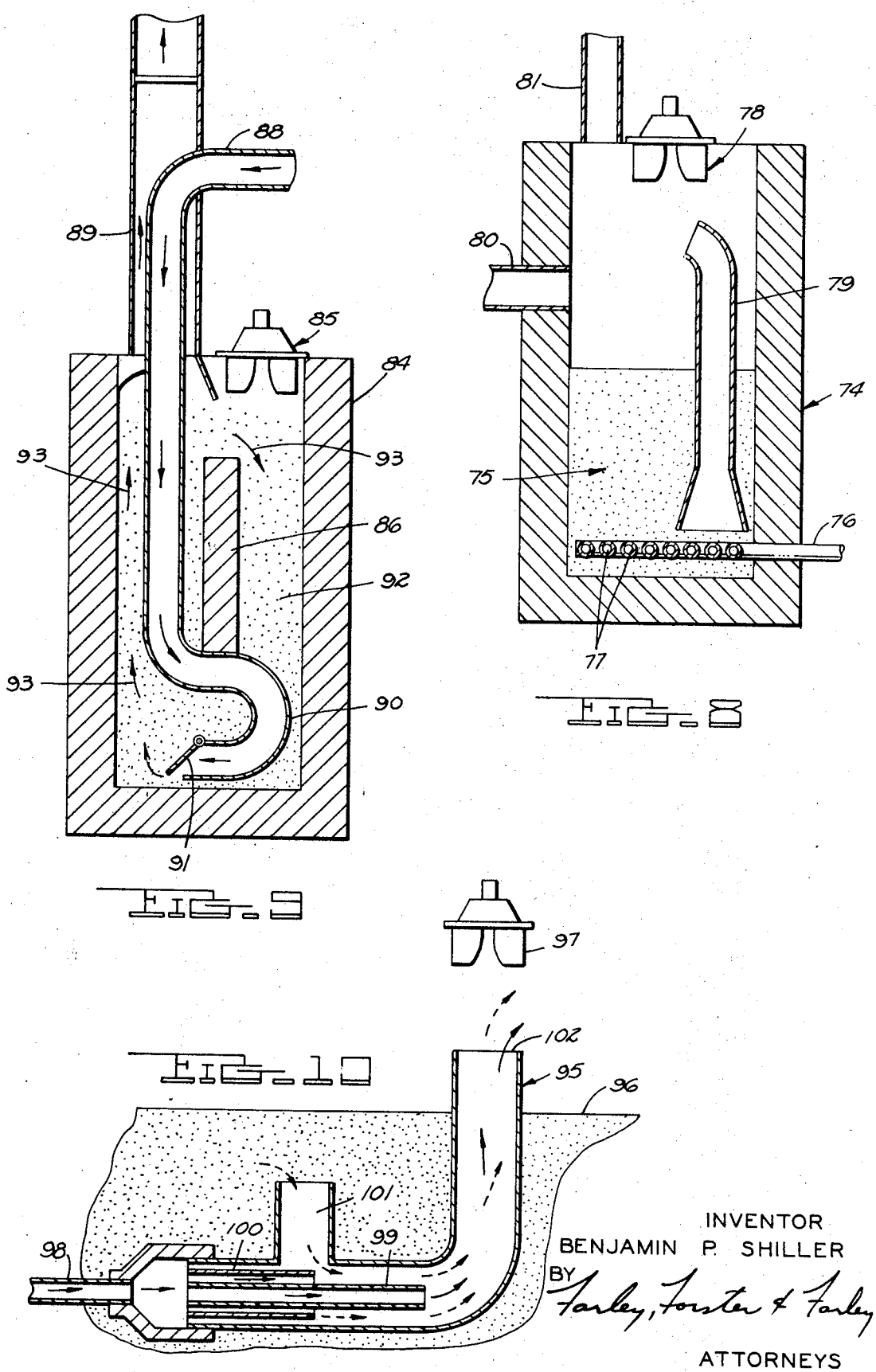

3,524,633
HEAT TRANSFER APPARATUS UTILIZING
PARTICLES OF GRANULAR MATERIAL
Benjamin P. Shiller, 7870 Eiseman Road,
Manchester, Mich. 48158
Filed July 24, 1968, Ser. No. 747,245
Int. Cl. F27b 15/00
U.S. Cl. 263—21
16 Claims

ABSTRACT OF THE DISCLOSURE

Apparatus having a chamber in which a bed of granular material such as sand is contained and is heated by a heating element mounted above the upper level of the bed. Heat transfer is enhanced by conveying particles of granular material from the bed through a high temperature zone adjacent the heating element and returning these particles to the bed, which is preferably fluidized and the fluidizing gas used as a conveying medium. The disclosure includes forms of this apparatus for transferring heat to a workpiece, for the combustion of fume laden gas, and for the combustion of wastes.

BACKGROUND OF THE INVENTION

Field of the invention

This invention relates to improvements in apparatus in which heat is transferred to a fluidized bed of granular material such as sand for the treatment of workpieces or the combustion of wastes.

Description of the prior art

A typical prior form of fluidized bed apparatus consists of a chamber containing a quantity of granular material, usually sand, and some arrangement such as a porous membrane for admitting a stream of gas such as air into the lower portion of the sand bed so that sand particles are suspended in the rising stream of gas. Heat is supplied to the fluidized sand, either by conduction from heating elements located externally of the chamber, or by radiation from a heating device mounted within the chamber, the latter arrangement being the more efficient.

Examples of uses for such apparatus include the treating of workpieces and the removal of combustible insulation from electrical parts as shown in U.S. Pats. 3,250,521 and 3,250,643.

SUMMARY OF THE INVENTION

The present invention provides, in an apparatus of the type including a chamber, a bed of granular material therein and a heating element mounted in the chamber above the upper level of the bed of granular material, a means for conveying particles of granular material from the bed through a zone of flaming combustion, and of relatively high temperature adjacent the heating element to raise the temperature of such particles.

In presently preferred embodiments of the invention, means are provided for fluidizing the bed of granular material by discharging a gas within or below the bed, and a device is employed which enables particles of granular material to be entrained in a stream of this fluidizing gas and conveyed thereby to the zone of relatively high temperature adjacent the heating element. These heated particles may be utilized both to increase the rate of heat exchange between the heating element and the bed of granular material and to aid in the oxidation of any fumes or other combustible contaminates present in the apparatus.

Objects and advantages of the invention may be illustrated by the following examples of representative applications:

(1) In apparatus used for removing a combustible coating from a workpiece, the combustible fumes evolved can be collected within the apparatus and discharged into the same zone of a combustion reaction, of relatively high temperature through which the particles of granular material are conveyed, the heated particles then serving as ignitors to enhance the fume combustion. Alternately, or additionally the collected fumes may be mixed with hot granular particles from the bed and this mixture sprayed or conveyed through the zone of relatively high temperature adjacent the heating element to provide for fume combustion.

(2) The apparatus may be employed to remove a combustible coating from a workpiece by spraying it with the granular particles after their temperature has been raised by being conveyed through the zone of relatively high temperature adjacent the heating element, these sprayed particles being returned to the bed and recirculated.

(3) The apparatus may be used as an incinerator of wastes such as paint or chemical sludge, sewage filter cake or similar material, by discharging the waste into the fluidized bed, with complete combustion of the waste and resulting fumes being enhanced and accomplished by the conveying and circulation of granular particles from the bed through the zone of relatively high temperature adjacent the heating element.

(4) The apparatus may be employed to decontaminate a fluidized bed material, such as spent foundry core sand, of combustible wastes, with complete combustion of any contaminate and fumes being obtained by the conveying of particles of the granular material through the zone of relative high temperature adjacent the heating element.

Other features, advantages, and uses of the invention will become more apparent from the description to follow of the representative embodiments disclosed in the accompanying drawings.

DESCRIPTION OF THE DRAWING

The accompanying drawing comprises the following views:

FIG. 1 is a plan view of an apparatus for decoating a workpiece by immersion in the fluidized bed;

FIGS. 2 and 3 are respectively sectional elevations taken as indicated by the lines 2—2 and 3—3 of FIG. 1;

FIG. 4 is a fragmentary sectional plan view taken substantially on the line 4—4 of FIG. 2.

FIG. 5 is a sectional elevation illustrating an alternate arrangement for fume incineration;

FIGS. 6 and 7 are sectional elevations illustrating a further form of apparatus for decoating a workpiece by spraying, FIG. 6 being taken as indicated by the line 6—6 of FIG. 7 and FIG. 7 on the line 7—7 of FIG. 6;

FIG. 8 is a schematic sectional elevation illustrating a form of apparatus for waste incineration;

FIG. 9 is a fragmentary sectional elevation of an alternate means for conveying particles of granular material to the zone of relatively high temperature; and, FIG. 10 is a schematic sectional elevation of a form of apparatus for fume combustion.

DESCRIPTION OF THE PREFERRED EMBODIMENTS

In the description to follow, the granular material for simplicity will be referred to as sand with the understanding that this term may be considered to apply to other types of refractory pellets, granular mixtures including catalyst pellets, or other granular materials which may be fluidized.

Workpiece treatment by immersion FIGS. 1-4

This form of apparatus consists of a chamber having a bottom wall 10, a pair of side walls 11 and 12, a rear end wall 13, a front end wall 14 equipped with a pair of movable doors 15, and a cover formed by a pair of top panels 16 separated from each other along the longitudinal center line of the container to provide a slot 18 extending part of the length of the chamber, the remainder of the slot being closed by a piece of flashing 20.

Workpieces to be treated—for example, workpieces from which a combustible coating is to be removed—are placed in a work holding basket 22 suspended from a cable 23 from an overhead hoist (not shown), and moved into the chamber through the doors 15, the cable 23 extending through the slot 18, and lowered to immerse the workpieces in a fluidized bed of sand 24 contained in a tank 25 in the lower portion of the chamber. The upper level of the sand bed 24 is indicated by the line 26.

Air for fluidizinig the sand bed 24 is supplied by a blower 28 to a plenum chamber 30 which extends around the sides 11 and 12 and ends 13 and 14 of the chamber, forming the lower portion of the side and end walls thereof. Two series of air distributing pipes communicate with the plenum chamber 30 as best shown in FIG. 4, one series of pipes 31 communicate with the plenum chamber along the side wall 11 and extend transversely across the chamber in alternate relation with pipes 32 of the second series connected to the plenum chamber along the side wall 12. The pipes 31 and 32 are suitably perforated to distribute air to the bottom of the sand bed 24 and fluidize it.

Heat is supplied to the chamber by a line-type gas burner 34 equipped with downwardly diverging perforated mixing plates 35. This burner 34 is mounted in a housing 36, formed of suitable refractory wall panels 37 and connected by duct work 38 to the outlet of a fan 39. As shown in FIG. 3, the heater housing 36 is also connected by a duct 40 to an exhaust duct 41 leading to an exhaust connection in the top of the chamber. An exhaust fan 42 is ducted to the exhaust connection and to an exhaust stack 43. Both the heater housing 36 and the exhaust duct 41 include baffles 44 and 45, respectively, which project below the upper level 26 of the sand bed 24.

The heating system also includes means for conveying sand from the bed 24 through the zone of relatively high temperature adjacent the heating element 34, and in the construction shown, this means consists of a number of tubular members 46. Each tubular member 46 has a discharge end 48 positioned below the heating element 34, and a substantially funnel-shaped inlet end 50 positioned within the sand bed 24 just above the fluidizing air pipes 31 and 32. When air under pressure is supplied through the pipes 31 and 32, the fluidized sand above these pipes and below the funnel-shaped inlets of the tubes 46 tends to rise through the tubes to the region of lower pressure at the discharge ends 48 thereof, and the upward velocity of this fluidized sand passing through the tubes 46 is increased by the convergence of the funnel-shaped portions 50 with the result that this fluidized sand is thrown from the discharge ends 48 into the flaming portion of the high temperature combustion zone under the burner 34, and falls back into the sand bed 24.

The temperature of this conveyed sand is naturally materially increased, and since fluidized sand acts similar to a liquid, this conveying of a portion of the sand through a high temperature zone adjacent the burner sets up a circulation within the sand bed and materially increases the rate at which heat is transferred to the bed from the burner. Apparatus of the type disclosed may be brought to the desired operating temperature of the sand bed (850° F., for example) in one-fourth to one-third the time required when heat transfer is obtained merely by conventional convection and radiation, with a corresponding decrease in the amount of fuel which must be burned in order to maintain the bed at the desired temperature.

Assuming the apparatus is employed for a decoating operation on the workpieces, such as the removal of paint or insulation, the immersion of these workpieces into the hot fluidized sand will cause hydro-carbon fumes to rise into the space above the sand bed. These fumes are drawn into the fan 39 and circulated downwardly through the duct 38 into the heater housing 36 and are drawn off through the connection 40 to the exhaust duct 41. As these fumes pass through the perforated mixing plates 35 of the heater and into the zone where the fluidized sand is being conveyed, fume combustion takes place. The completeness of this fume combustion is increased by the mixing which takes place of the fumes and the heated sand. When this conveyed sand is thrown into the combustion reaction zone, individual sand particles are surrounded by many radiant point sources of the flame. These sand particles each have a large surface to mass ratio, can be quickly heated, extend the surface area subjected to the radiation effect of the burner and act as ignitors for fume combustion.

An alternate arrangement for fume combustion is illustrated in FIG. 5. Combustible fumes above the upper level 52 of the fluidized sand bed 53 are circulated by a fan 54 through a spout 55 discharging below the upper level 52 of the sand bed and equipped with a suitable deflector 56. The spout 55 and deflector 56 are arranged to direct a mixture of fume laden air and sand upwardly into the high temperature combustion zone of the burner 58 where this mixture also encounters high temperature sand conveyed through the combustion zone by funnel-shaped tubes 57 similar to the tubes 46 previously described.

Each of these arrangements for fume combustion increase the time and temperature available for the combustion process to the place, and further insure the completion of this process to satisfactory limits by the mixing of fume laden air and heated sand particles.

Work treatment by spraying (FIGS. 6 and 7)

Apparatus for the continuous treatment, as distinguished from batch treatment, of workpieces is illustrated in FIGS. 6 and 7 where an open-ended chamber 60 is mounted in the path of travel of an overhead conveyor 61, the conveyor passing through the chamber 60 for the removal of combustible material such as a paint deposit from the conveyor carriers 62. The carriers 62, attached to the conveyor chain moving in the direction indicated by the arrow 63, pass through an entry vestibule 64 into the chamber 60 and through an exit vestibule 65. Each vestibule is vented by an exhaust stack 66.

A line-type of gas burner 67 is mounted at one side of the chamber 60 to direct heat onto the carriers 62. A sand bed 68 in the lower portion of the chamber 60 is fluidized by air entering through a conduit 69 suitably connected to a series of fluidizing pipes 70. The sand from the bed 68 is conveyed by a series of tubular members 71 through the high temperature combustion zone adjacent burner 67 and allowed to fall over the passing carriers 62. Each of the tubular members 71 includes a funnel shaped lower portion 72 positioned over the fluidizing pipes 70, as previously described.

The tubular members 71 and burner 67 can obviously be arranged in any desired manner for optimum transfer of heat to the workpieces being treated, and in this apparatus, the conveyed heated sand operates to assist in the combustion of the material on the workpiece and of the fumes released by such combustion.

Waste incineration (FIG. 8)

This schematically illustrated apparatus includes an enclosed chamber 74 containing a bed of sand 75 which is fluidized by air entering the conduit 76 and distributed to the sand bed by pipes 77. The sand bed 75 is heated by a burner 78 and a portion of the fluidized sand is conveyed through the combustion zone of the burner by tubular members 79 of the type previously described. These members 79 are arranged to not only direct sand through the burner combustion zone but also into the path of a combustible waste fed to the chamber 74 through the passage 80, and also into the path of combustion fumes leaving the chamber through the exhaust opening 81. For example, this combustible waste may be sewage filter cake or paint sludge from paint spray booths. The waste entering the chamber will drop onto the top of the fluidized sand bed 75 and will be covered by the very hot sand conveyed through the combustion zone and will be incinerated. The incinerating process is enhanced by the mixing action of the fluidized sand in the bed 75, the rapid heat transfer from the heated conveyed sand, and finally by the conveying of waste which settles to the bottom of the sand bed through the tubular members 79 and the combustion zone of the burner 78.

Fume combustion (FIG. 9)

This illustrates the employment of the invention for the oxidizing of combustible contaminants in a waste gas stream, such as the exhaust from paint spray booths, industrial ovens, or internal combustion engines.

The apparatus consists of an enclosed chamber 84 equipped with a radiant type gas burner 85 and an internal baffle 86. The waste gas stream to be purified is fed to the chamber 84 through a conduit 88, a portion of which is concentric with and surrounded by an exhaust conduit 89 connected to the top of the chamber 84. Inlet conduit 88 passes downwardly into the chamber and includes an end portion having a reverse curve 90 and a discharge end preferably provided with an adjustable eductor 91, which provides a means for fluidizing and conveying sand or catalytic pellets 92 contained within the chamber 84 upwardly as indicated by the arrows 93 around the conduit 88, over the baffle 86 and through the relatively high temperature zone adjacent the burner 85.

In the operation of this apparatus, the temperature of the fume ladened waste gas is first increased by heat exchange from the exhaust gas passing through the stack 89; the temperature is further increased by heat exchange from the heated sand circulating around the portion of the inlet conduit 88 within the chamber, and the combination of these pre-heating steps and the mixing of the fume ladened gas with the heated sand, will satisfy the three requirements of time, temperature and turbulence required for combustion of the oxidizable contaminants in the waste gas. In this apparatus sand acts as a regenerative heat exchange media by circulating through the fluidizing zone around the conduit 88, and returning to this zone by gravity past the high temperature heat zone adjacent the burner 85. In some applications of this apparatus the purified exhaust from the stack 89 may be returned to the process from whence the fume-ladened waste gas originated in order to reduce the overall fuel requirement.

Alternate sand conveying means (FIG. 10)

FIG. 10 illustrates an alternate sand conveying means, or sand spout 95, mounted below the surface 96 of a fluidized sand bed for spraying sand through the high temperature zone adjacent a burner 97. Air enters the sand spout through a pipe 98, flows through concentric passages 99 and 100, and by venturi action between the passage 100 and a sand inlet passage 101, pulls sand in and propels it out the discharge end 102 of the apparatus.

I claim:

1. In an apparatus of the type including a chamber, a bed of granular material therein, means for fluidizing said bed of granular material, and a heating element mounted in the chamber above the upper level of said bed; the improvement comprising,
    means for conveying particles of granular material from said bed through a zone of relatively high temperature adjacent the heating means to raise the temperature of said particles and returning said particles to said bed.

2. Apparatus according to claim 1 wherein the conveying means comprises a device for entraining particles of the granular material in a stream of gas.

3. Apparatus according to claim 2 wherein the gas is a fume-laden mixture containing unburned hydrocarbons.

4. Apparatus according to claim 2 wherein the device for entraining granular material comprises a tubular member having an inlet and a discharge end, the inlet end having a flared mouth, means mounting the member with the inlet end thereof in the bed of granular material and the discharge end thereof adjacent the heating element, and means supplying said gas to the inlet end of the member.

5. Apparatus according to claim 2 wherein the device for entraining granular material comprises a conduit having a discharge end, means mounting the conduit in the chamber with the discharge end thereof at least partially below the upper level of the bed of granular material, means for moving a stream of gas through the conduit, the discharge end thereof being directed to circulate granular material toward the zone of relatively high temperature adjacent the heating element.

6. Apparatus according to claim 2 wherein the device for entraining granular material comprises a tube having a discharge end directed toward the zone of relatively high temperature adjacent the heating element and a portion extending through the bed of granular material below the upper level thereof, a lateral opening in said portion for the admission of granular material to the tube, and means for moving a stream of gas through the tube.

7. Apparatus according to claim 1 wherein the heating element is a burner type having a flaming combustion zone which forms said zone of relatively high temperature.

8. Apparatus according to claim 7 wherein the conveying means comprises a tubular device for spraying particles of the granular material through said flaming combustion zone.

9. Apparatus according to claim 1 wherein the means for fluidizing said bed of granular material comprises means for discharging a gas within said bed, and wherein the means for conveying particles of granular material from said bed utilizes at least a portion of the fluidizing gas.

10. Apparatus accordng to claim 9 wherein the means for conveying particles of granular material from the bed through the zone of relatively high temperature comprises a tubular member having a discharge end positioned adjacent the heating element and a substantially funnel-shaped inlet end positioned within the bed of granular particles adjacent at least a portion of the region at which said gas is discharged to fluidize the granular material.

11. Apparatus according to claim 9 further comprising means for supplying combustible material into the chamber for combustion therein.

12. Apparatus according to claim 11 wherein said means for supplying combustible material is arranged to discharge such material into the chamber above the level of the fluidized bed and into a region where particles of granular material are returning to the bed from the zone of relatively high temperature.

13. Apparatus according to claim 1 further comprising means for discharging a fume-laden mixture containing unburned hydrocarbons into said zone of relatively high temperature through which said particles of granular material are conveyed.

14. Apparatus according to claim 13 wherein said means for discharging said fume-laden mixture includes means for entraining other particles of granular material from the bed with said mixture.

15. Apparatus according to claim 1 further comprising means for positioning a workpiece within the chamber, said conveying means being arranged to discharge said particles of said granular material through the zone of relatively high temperature and onto the workpiece.

16. Apparatus according to claim 15 wherein the heating element is mounted to apply heat to the workpiece.

References Cited
UNITED STATES PATENTS

| | | |
|---|---|---|
| 2,985,439 | 5/1961 | Scivally et al. |
| 3,197,328 | 7/1965 | Jung et al. |
| 3,250,521 | 5/1966 | Sergent. |
| 3,397,657 | 8/1968 | Tada _____ 110—8 |
| 3,417,978 | 12/1968 | Suzukawa et al. |

JOHN J. CAMBY, Primary Examiner

U.S. Cl. X.R.

34—57; 110—8; 165—104